F. R. KNOWLTON.
Cigar-Box.

No. 219,819.    Patented Sept. 23, 1879.

Witnesses:
H. S. Talbot
W. R. Marble

Inventor:
Frank R. Knowlton
By Sylvenus L. Walker
Atty

UNITED STATES PATENT OFFICE.

FRANK R. KNOWLTON, OF WEST ACTON, MASSACHUSETTS.

IMPROVEMENT IN CIGAR-BOXES.

Specification forming part of Letters Patent No. 219,819, dated September 23, 1879; application filed May 13, 1878.

*To all whom it may concern:*

Be it known that I, FRANK R. KNOWLTON, of West Acton, in the county of Middlesex and State of Massachusetts, have invented certain new and useful Improvements in Cigar-Boxes, of which the following is a specification.

The object of my invention is to provide a show-case cigar-box which shall be capable of holding the requisite number of cigars for a box, as heretofore, to be placed therein at the manufactory, and fastened and stamped with the necessary United States revenue-stamps, as now required, and when ready for retail from such box are so arranged as to be seen to advantage through a glass top, which will serve to keep them from becoming dusty; and a further object is to provide means of imparting moisture or fragrance, or both, to the cigars; and it consists in the construction, combination, and arrangement of the several parts composing the same, as hereinafter more fully described and set forth.

Figure 1:
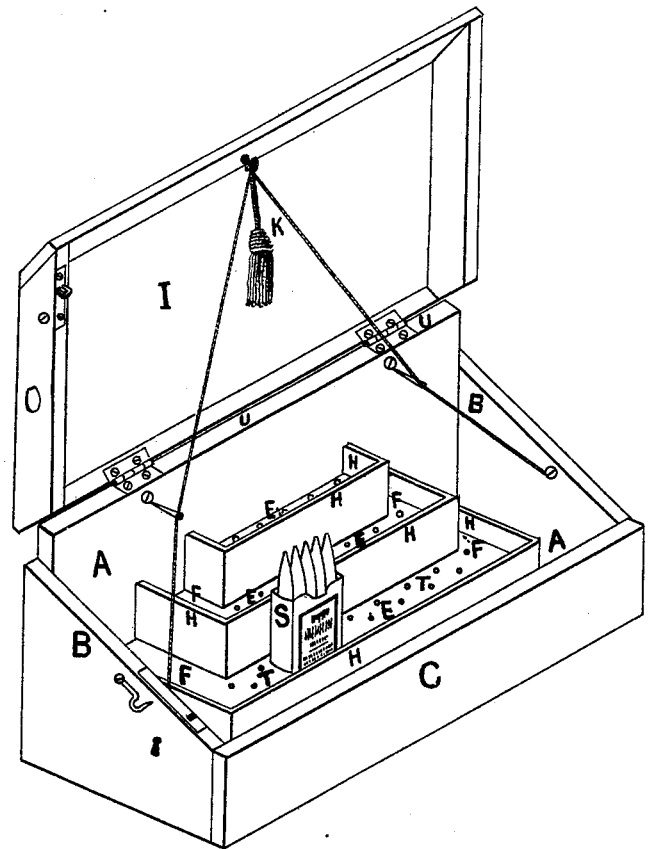
Figure 2:
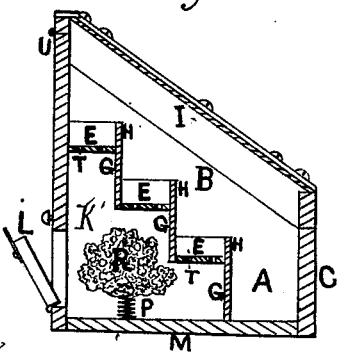

Figure 1 is a perspective view of my invention in an open position. Fig. 2 is a vertical transverse section of the same with the cover closed.

A represents the body of the box, which is of rectangular shape, and provided with ends B, which incline on their upper edges from front to rear, and are formed on an angle of about forty-five degrees, more or less, the front-side portion, C, of the box A being about two and one-half inches in height. Within this box is secured a series of longitudinal shelves, E, having several small holes or perforations, T, as shown in Fig. 1. These shelves are arranged equidistant apart, and have return ends or transverse portions F, each succeeding end portion, F, and shelf E being made shorter from the lower one upward, so as to form a sort of stairs or pyramid upon three sides, being the front and ends, as shown. Now to the fronts of these shelves E and F, I attach narrow upright strips H, which are about one-half the height of the space or elevation of one shelf above another.

It will be seen that the series of shelves E F and their vertical supports G form a series of steps or stairs, leaving beneath and back of the same a compartment or space, K', provided with a rear door, L, which is hinged to the back side of the box, so as to be opened outwardly, as shown in Fig. 2.

To the bottom M of the box is secured a vertical stud or a coiled spring, P, to the upper end of which is attached a sponge, R, which may be saturated with water, cologne, or any desired essence or liquid, to impart moisture or fragrance to the cigars S when placed in the box; and the glass top I, secured within the hinged frame O, attached to the rear edge, U, of the box, is closed down and fastened by hasps, lock, or otherwise, as may be desired.

The cord K sustains the lid in nearly a vertical position when open, as shown in Fig. 1.

The glass I is secured in the frame O by a thin light molding, which is placed on top of the glass at its edges and fastened to the frame by small screws, as shown.

Having thus described my invention, what I claim is—

As an improved manufacture, a cigar-box having an inclined glass top, I, secured within the hinged frame O, said box being provided with a series of longitudinal shelves, E, having perforations T, and short transverse portions F and vertical pieces G H, arranged in pyramidal form, as shown, in combination with the receptacle K', sponge R, and rear door, L, substantially as and for the purposes set forth.

FRANK R. KNOWLTON.

Witnesses:
SYLVENUS WALKER,
W. R. MARBLE.